(12) United States Patent
Yokoi

(10) Patent No.: US 7,757,172 B2
(45) Date of Patent: Jul. 13, 2010

(54) ELECTRONIC EQUIPMENT AND METHOD FOR DISPLAYING IMAGES

(75) Inventor: Hidetoshi Yokoi, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/196,119

(22) Filed: Aug. 21, 2008

(65) Prior Publication Data

US 2009/0172545 A1 Jul. 2, 2009

(30) Foreign Application Priority Data

Dec. 27, 2007 (JP) ............... 2007-337745

(51) Int. Cl.
*G06F 3/00* (2006.01)
*G06F 3/048* (2006.01)

(52) U.S. Cl. .................. 715/721; 715/810; 725/41

(58) Field of Classification Search ........... 715/721, 715/810; 725/41
See application file for complete search history.

(56) References Cited

U.S. PATENT DOCUMENTS

| | | | | |
|---|---|---|---|---|
| 6,118,923 | A * | 9/2000 | Rodriguez | 386/69 |
| 6,278,446 | B1 * | 8/2001 | Liou et al. | 715/700 |
| 6,584,463 | B2 * | 6/2003 | Morita et al. | 707/3 |
| 6,741,977 | B1 * | 5/2004 | Nagaya et al. | 707/1 |
| 7,471,877 | B2 * | 12/2008 | Watanabe | 386/92 |
| 2003/0184598 | A1 * | 10/2003 | Graham | 345/838 |
| 2005/0108644 | A1 * | 5/2005 | Finke-Anlauff et al. | 715/721 |
| 2005/0187943 | A1 * | 8/2005 | Finke-Anlauff et al. | 707/100 |
| 2006/0050934 | A1 * | 3/2006 | Asai | 382/118 |
| 2007/0237360 | A1 * | 10/2007 | Irie et al. | 382/103 |
| 2008/0022230 | A1 * | 1/2008 | Ogawa et al. | 715/838 |
| 2008/0028294 | A1 * | 1/2008 | Sell et al. | 715/234 |
| 2008/0080743 | A1 * | 4/2008 | Schneiderman et al. | 382/118 |
| 2008/0131073 | A1 * | 6/2008 | Ogawa et al. | 386/52 |
| 2008/0256450 | A1 * | 10/2008 | Takakura et al. | 715/721 |

FOREIGN PATENT DOCUMENTS

| | | |
|---|---|---|
| JP | 2001309269 | 11/2001 |
| JP | 2004260412 | 9/2004 |
| JP | 2007-281680 | 10/2007 |
| JP | 2007323698 | 12/2007 |
| WO | WO 017778 | 3/2000 |

OTHER PUBLICATIONS

Japanese Patent Application No. 2007-337745 Office Action mailed Feb. 3, 2009 (English Translation).

* cited by examiner

*Primary Examiner*—Tadesse Hailu
*Assistant Examiner*—Nicholas S Ulrich
(74) *Attorney, Agent, or Firm*—Blakely, Sokoloff, Taylor & Zafman LLP

(57) ABSTRACT

An electronic equipment includes: a storage unit that stores a plurality of facial images extracted from video data and time stamp information indicating time points when the plurality of facial images appear in the video data; and a processor that operates, based on the time stamp information, to: arrange a plurality of facial image display areas in a two-dimensional display area in a grid layout having a given number of rows and a plurality of columns, each of the columns being assigned with respective time zones divided from a total time length of the video data; and display the facial images, which belong to each of the time zones assigned to the columns, in the facial image display areas included in the respective columns.

7 Claims, 14 Drawing Sheets

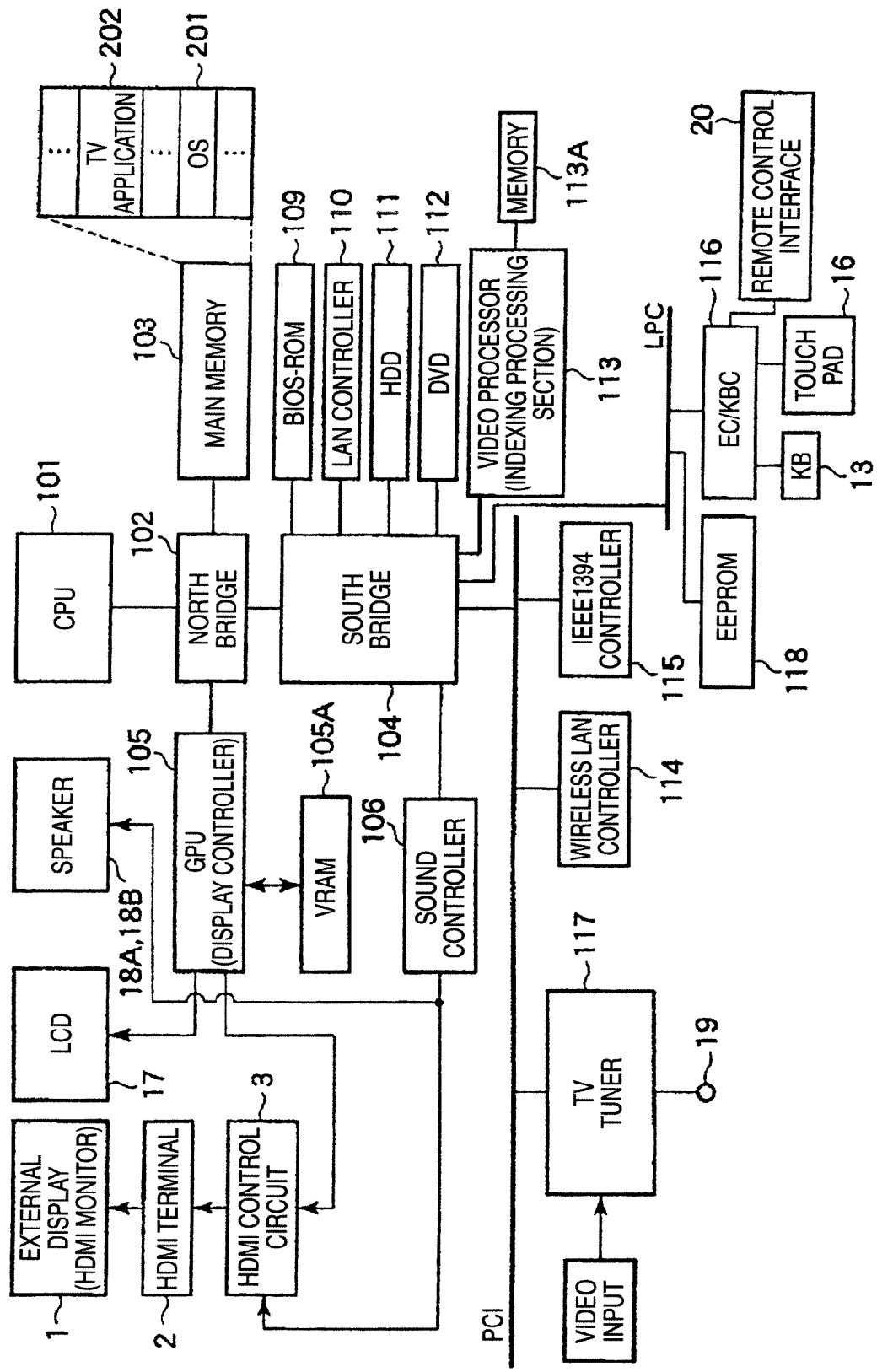

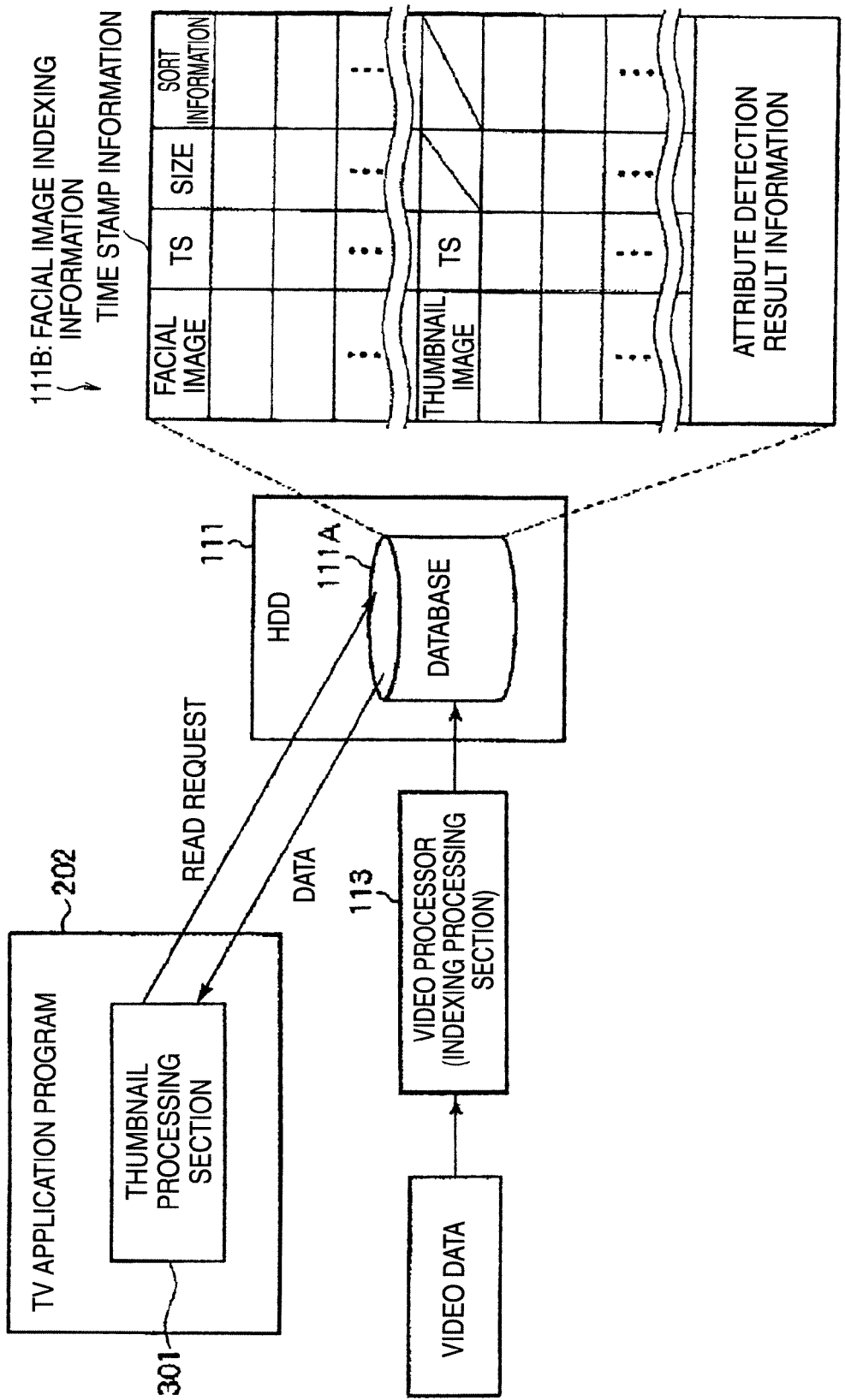

FIG. 4

ATTRIBUTE DETECTION RESULT INFORMATION

COMMERCIAL SECTION TABLE

| COMMERCIAL SECTION 1 | START TIME, END TIME |
|---|---|
| COMMERCIAL SECTION 2 | START TIME, END TIME |
| ⋮ | ⋮ |

MUSIC SECTION TABLE

| MUSIC SECTION 1 | START TIME, END TIME |
|---|---|
| MUSIC SECTION 2 | START TIME, END TIME |
| ⋮ | ⋮ |

TALK SECTION TABLE

| TALK SECTION 1 | START TIME, END TIME |
|---|---|
| TALK SECTION 2 | START TIME, END TIME |
| ⋮ | ⋮ |

CHEER/UPSURGE LEVEL TABLE

| TIME | CHEER LEVEL | UPSURGE LEVEL |
|---|---|---|
| T1 | 10 | 5 |
| T2 | 20 | 5 |
| T3 | 10 | 6 |
| ⋮ | ⋮ | ⋮ |

ELECTRONIC EQUIPMENT AND METHOD FOR DISPLAYING IMAGES

CROSS-REFERENCE TO RELATED APPLICATIONS

The application is based upon and claims the benefit of priority from Japanese Patent Application No. 2007-337745, filed on Dec. 27, 2007, the entire content of which are incorporated herein by reference.

BACKGROUND

1. Field

One embodiment of the present invention relates to an electronic equipment and a method for displaying images.

2. Description of the Related Art

Electronic equipments, such as a video recorder and a personal computer, are generally capable of recording and reproducing various video data including TV broadcast program. Each of the video data stored in the electronic equipment is given with a title name. However, it is difficult for a user to know what is contained in each of the video data only from the title names. Therefore, the user is required to play the video data to know what is contained in the video data. However, even when the video data is played using a variable speed playback function, it takes much time to play the video data having a long length of time.

There is proposed an electronic equipment having a character browsing function. In a character browsing mode provided in the electronic equipment, facial images of characters appearing in video contents are displayed to in arranged manner to allow the user to browse the characters. An example of such electronic equipment is disclosed in JP-A-2001-309269.

However, when facial images of characters are simply arranged as described in JP-A-2001-309269, the user cannot know at which time point the characters appear in the video contents. The user may want to play the video contents only for the time points when the desired character (or a group of characters) appears. Accordingly, there is a demand for an implementation of a new function for showing the user which character appears in the video contents at each time points. In addition, there is also a demand for an implementation of similar new function for showing the user an image that allows the user to know the details of the video contents at each time points.

SUMMARY

According to a first aspect of the present invention, there is provided an electronic equipment including: a storage unit that stores a plurality of facial images extracted from video data and time stamp information indicating time points when the plurality of facial images appear in the video data; and a processor that operates, based on the time stamp information, to: arrange a plurality of facial image display areas in a two-dimensional display area in a grid layout having a given number of rows and a plurality of columns, each of the columns being assigned with respective time zones divided from a total time length of the video data; and display the facial images, which belong to each of the time zones assigned to the columns, in the facial image display areas included in the respective columns.

According to a second aspect of the present invention, there is provided a method for displaying images for an electronic equipment having a storage unit that stores a plurality of facial images extracted from video data and time stamp information indicating time points when the plurality of facial images appear in the video data, the method including: arranging, based on the time stamp information, a plurality of facial image display areas in a two-dimensional display area in a grid layout having a given number of rows and a plurality of columns, each of the columns being assigned with respective time zones divided from a total time length of the video data; and displaying, based on the time stamp information, the facial images, which belong to each of the time zones assigned to the columns, in the facial image display areas included in the respective columns.

BRIEF DESCRIPTION OF THE SEVERAL VIEWS OF THE DRAWINGS

A general configuration that implements the various feature of the invention will now be described with reference to the drawings. The drawings and the associated descriptions are provided to illustrate embodiments of the invention and not to limit the scope of the invention.

FIG. 2 is a block diagram showing an example of a system configuration of the electronic equipment of the embodiment.

FIG. 3 is a block diagram explaining a facial image browsing function of the electronic equipment of the embodiment.

FIG. 4 is a view showing an example of section attribute information (attribute detection result information) used in the electronic equipment of the embodiment.

DETAILED DESCRIPTION

Figure 1:
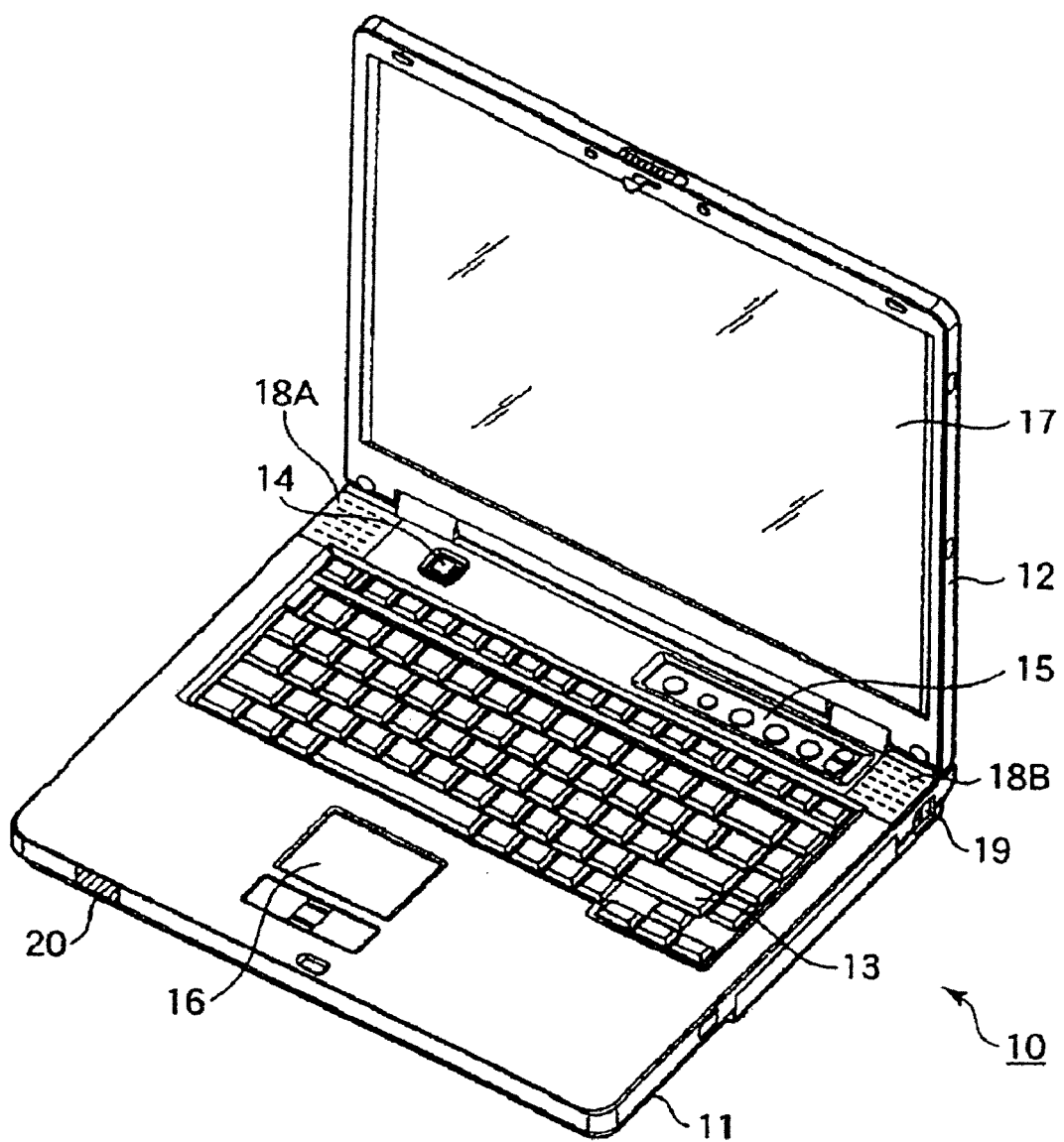
FIG. 1 is a perspective view showing an electronic equipment according to an embodiment of the present invention.

An embodiment of the present invention will be described with reference to the accompanying drawings.

A configuration of an electronic equipment according to an embodiment of the present invention will be described with reference to FIGS. 1 and 2. The electronic equipment of the present embodiment is implemented by a notebook-sized personal computer 10, for example, which serves as an information processing equipment.

The personal computer 10 is configured to include a HDD (Hard Disk Drive) 111 as a storage unit, and a thumbnail processing section 301. The HDD 111 stores a plurality of facial images extracted from a video data, which will be described later, and time stamp information. The thumbnail processing section 301 generates a plurality of facial image display areas, which are contained in a two-dimensional display area and are arranged in a grid layout that is defined by a predetermined number of rows and a plurality of columns to which a plurality of time zones constituting a total time length of the video data are assigned respectively, based on the time stamp information, and also aligns and displays the facial images belonging to the time zones assigned to a plurality of columns in a plurality of facial image display areas.

In the description, the term "facial image" refers to an image that contains a facial image of a person (or character) who appears on the scene of the video data, which is extracted from the video data by the method described later.

The term "thumbnail" refers to images that are extracted from the video data by the number that is fewer than predetermined rows in the concerned columns based on a method described later when columns, in which the facial image is not filled in the predetermined rows respectively, out of a plurality of columns exist, and indicates what contents are contained in the video data. The facial image and the thumbnail are displayed in a mixed style in a face thumbnail display area. As an example of the method of extracting the thumbnails from the video data, there are the method of extracting the image corresponding to a border between scenes as the thumbnail based on the time stamp information when such border exist in the time zone allocated to the concerned columns, and the method of splitting the time zone allocated to the concerned columns at an equal time interval based on the number that is fewer than predetermined rows, and then extracting the image corresponding to the border as the thumbnail.

The term "scene" refers to the video data that are split into attribute sections (commercial section, music section, and talk section) described later by an indexing process described later respectively, and a "border between scenes" refers to the border between adjacent scenes. Also, the image on the border between the scenes corresponds to the image located at a start point of time of a new scene as a time series.

The term "time stamp information" refers to information that indicates a point of time at which the facial image and the thumbnail appear on the scene in the video data.

The term "facial image display area" refers to an area of the indexing view screen on which the facial images and the thumbnails are displayed.

The personal computer 10 records and reproduces the video data (audio-visual contents data), such as broadcast program data, and video data being input from an external equipment. That is, the personal computer 10 has a television (TV) function for use in viewing and recording the broadcast program data that are broadcasted through the TV broadcast signals. The TV function is implemented by the TV application program that is installed previously into the personal computer 10, for example. Also, the TV function contains a function of recording video data being input from an external AV equipment and a function of playing the recorded video data and the recorded the broadcast program data.

the personal computer 10 has a facial image browsing function, and a thumbnail image displaying function. The facial image browsing function is used to display a list of facial images of persons who appear on the scene in the video data such as video data, broadcast program data, etc. stored in the personal computer 10. The thumbnail image displaying function is used to display images (reduced images) corresponding to a plurality of frames extracted from the video data at an equal time interval, for example, respectively.

The facial image browsing function and the thumbnail image displaying function are implemented in the personal computer 10, for example, as one of the TV function. The facial image browsing function is one of video indexing functions that indicate an outline of the video data to the user. The facial image browsing function can indicate which person appears on the scene around which time zone in overall video data. The facial image browsing function can display a list of persons while focusing attention on a predetermined attribute section contained in the video data.

FIG. 1 is a perspective view showing a state that a display unit of the personal computer 10 is opened. The personal computer 10 is configured by a computer main body 11 and a display unit 12. A display unit including a TFT-LCD (Thin Film Transistor Liquid Crystal Display) 17 is installed in the display unit 12.

The display unit 12 is attached to the computer main body 11 to be rotatable between its opened position in which an upper surface of the computer main body 11 is exposed and its closed position in which the upper surface of the computer main body 11 is covered. The computer main body 11 has a thin box type casing. A keyboard 13, a power button 14 for turning a power of the personal computer 10 ON/OFF, an input operation panel 15, a touch pad 16, and speakers 18A, 18B are arranged on a top face of the computer main body 11.

The input operation panel 15 serves an input unit that allow a user to input an event corresponding to the pressed button, and is equipped with a plurality of buttons that are used to start a plurality of functions respectively. A group of operation buttons used to control the TV function (viewing, recording, playing of the recorded broadcast program data/video data) are contained in these button groups. Also, a remote control interface 20 for communicating with a remote controller that remotely controls the TV function of the personal computer 10 is provided to a front of the computer main body 11. The remote control interface 20 includes an infrared signal receiver.

A TV broadcast antenna terminal 19 is provided to a right face of the computer main body 11, for example. Also, an external display connector that meets the HDMI (High-Definition Multimedia Interface) standard, for example, is provided to a back surface of the computer main body 11, for example. The external display connector is used to output video data (video image data) contained in the video data such as broadcast program data, or the like to an external display.

Next, a system configuration of the personal computer 10 will be described with reference to FIG. 2.

As shown in FIG. 2, the personal computer 10 includes a CPU 101, a north bridge 102, a main memory 103, a south bridge 104, a graphic processing unit (GPU) 105, a video memory (VRAM) 105A, a sound controller 106, a BIOS-ROM 109, a LAN controller 110, a HDD 111, a DVD drive 112, a video processor 113, a memory 113A, a wireless LAN controller 114, an IEEE 1394 controller 115, an embedded controller/keyboard controller IC (EC/KBC) 116, a TV tuner 117, and an EEPROM 118.

The CPU 101 is a processor that controls an operation of the personal computer 10. The CPU 101 executes various application programs such as an operating system (OS) 201, a TV application 202, and the like loaded from the HDD 111 to the main memory 103. The TV application 202 is software that executes the TV function. The TV application 202 executes a live playing process of viewing the broadcast program data received by the TV tuner 117, a video recording process of recording the received broadcast program data on the HDD 111, a playing process of playing the broadcast program data/the video data recorded on the HDD 111, etc. Also, the CPU 101 executes BIOS (Basic Input Output System) stored in the BIOS-ROM 109. The BIOS is a program for use in hardware control.

The north bridge 102 is a bridge device that connects a local bus of the CPU 101 and the south bridge 104. A memory controller for use in the access control of the main memory 103 is built in the north bridge 102. Also, the north bridge 102 has a function of communicating with the GPU 105 via a serial bus, such as those based on the PCI EXPRESS standard.

The GPU 105 is a display controller that controls the LCD 17 used as a display monitor of the personal computer 10. A display signal generated by the GPU 105 is sent to the LCD 17. Also, the GPU 105 can send out a digital video signal to an external display device 1 via a HDMI control circuit 3 and a HDMI terminal 2.

The HDMI terminal 2 serves as the external display connector, which is briefly described above. The HDMI terminal 2 is capable of sending out a non-compressed digital video signal and a digital audio signal to the external display device 1 like a TV through one cable. The HDMI control circuit 3 is an interface that is used to send out the digital video signal to the external display device 1 called a HDMI monitor via the HDMI terminal 2.

The south bridge 104 controls respective devices on an LPC (Low Pin Count) bus and respective devices on a PCI (Peripheral Component Interconnect) bus. Also, the south bridge 104 contains an IDE (Integrated Drive Electronics) controller to control the hard disk drive (HDD) 111 and the DVD drive 112. Also, the south bridge 104 has a function of communicating with the sound controller 106.

The video processor 113 is connected to the south bridge 104 via the serial bus, such as those based on the PCI EXPRESS standard.

The video processor 113 is a processor that performs various processes concerning the foregoing video indexing. The video processor 113 functions as an indexing processing section to execute the video indexing process. That is, in the video indexing process, the video processor 113 extracts a plurality of facial images from the video image data contained in the video data and outputs time stamp information indicating a point of time at which respective extracted facial images appear in the scene in the video data, and the like. The extraction of the facial image is performed by a face detecting process of detecting the facial image from each frame of the video image data, a cutting process of cutting out the detected facial image from the frame, and the like, for example. The extraction of the facial image can be performed by analyzing a feature of the image in each frame, and searching the area that has a feature similar to a facial image feature sample prepared in advance, for example. The facial image feature sample is feature data that are obtained by processing statistically respective facial image features of a large number of persons.

Also, the video processor 113 executes a process of detecting a commercial section contained in the video data, and a sound indexing process, for example. Normally, a time length of each commercial section is set in one of several time lengths that are decided previously. Also, a silent period of a predetermined time length exists before and after the commercial section. Therefore, in the commercial section detecting process, audio data contained in the video data are analyzed and a silent period of a predetermined time length is detected, for example. Also, the section that is put between two successive detected silent sections and contains partial data whose time length is a predetermined value or more is detected as the commercial section.

The sound indexing process denotes an indexing process that detects a music section, in which a music is being played, and a talk section, in which a talk is being made by a person, contained in the video data, by analyzing the audio data contained in the video data. In the sound indexing process, a feature of a frequency spectrum of the audio data is analyzed and a music section and a talk section are detected in response to the feature of the frequency spectrum, for example. Since the feature of the frequency spectrum corresponding to a music section and the feature of the frequency spectrum corresponding to a talk section are different mutually, a music section and a talk section can be detected respectively by analyzing the feature of the frequency vector. Also, the section having the frequency spectrum in which the feature of the frequency spectrum corresponding to the music section and the feature of the frequency spectrum corresponding to the talk section are mixed together can be detected as an overlapping section in which the music section and the talk section are overlapped mutually.

In the talk section detecting process, the talker segmentation technology, the talker clustering technology, or the like is employed, for example, and accordingly a change of the talker can be detected. The period in which the same talker (or the same talker group) talks continuously corresponds to one talk section.

In the sound indexing process, a cheer level detecting process of detecting a cheer level every partial data (data of a predetermined time length) in the video data and an upsurge level detecting process of detecting an upsurge level every partial data in the video data are performed.

The cheer level indicates a loudness of cheer. The cheer is the sound produced by mixed voices of a large number of persons. The sound produced by mixed voices of a large number of persons has a particular frequency spectrum distribution. In the cheer level detecting process, the frequency spectrum of the audio data contained in the video data is analyzed, and the cheer level of each partial data is detected in accordance with the analyzed result of the frequency spectrum. The upsurge level is a sound volume level in the section in which a sound volume level in excess of a predetermined level is generated continuously for a predetermined time length or more. For example, a sound volume level of the sound such as relatively vigorous applause, large laughing voice, or the like corresponds to the upsurge level. In the upsurge level detecting process, a distribution of the sound volume of the audio data contained in the video data is analyzed, and the upsurge level of each partial data is detected in accordance with the analyzed result.

The memory 113A is used as a working memory of the video processor 113. In order to execute the indexing process (CM detecting process, video indexing process, and sound indexing process), a great deal of computational complexity is required. In the present embodiment, the video processor 113 as a special-purpose processor different from the CPU 101 is used as a backend processor, and the indexing process is executed by the video processor 113. Therefore, the indexing process can be executed not to bring upon an increase of a load of the CPU 101. Here, as described above, the CM detecting process is executed by analyzing the audio data. Therefore, in the following, the CM detecting process is handled as one process in the sound indexing process.

The sound controller 106 is a sound source device, and outputs the audio data as the played object to the speakers 18A, 18B or the HDMI control circuit 3.

The wireless LAN controller 114 is a radio communication device that handles radio communication based on IEEE 802.11 standard, for example. The IEEE 1394 controller 115 holds communication with the external equipment via the serial bus based on the IEEE 1394 standard.

The embedded controller/keyboard controller IC (EC/KBC) 116 is one-chip microcomputer in which the embedded controller for managing a power and the keyboard controller for controlling the keyboard (KB) 13 and the touch pad 16 are integrated. The embedded controller/keyboard controller IC (EC/KBC) 116 has a function of turning a power of the personal computer 10 ON/OFF in response to the user's operation of the power button 14. Also, the embedded controller/keyboard controller IC (EC/KBC) 116 has a function of communicating with the remote control interface 20.

The TV tuner 117 is a receiver device that receives the broadcast program data broadcasted by the television (TV) broadcast signal, and is connected to the antenna terminal 19. The TV tuner 117 is implemented as a digital TV tuner that can receive digital broadcast program data such as a digital terrestrial TV broadcast, for example. Also, the TV tuner 117 has a function of capturing the video data being input from the external equipment.

Next, the facial image browsing function executed by the TV application program 202 will be described with reference to FIG. 3 hereunder.

As described above, the indexing process (video indexing process and sound indexing process) for the video data like the broadcast program data is executed by the video processor 113 acting as an indexing processing section.

The video processor 113 applies the indexing process to the video data such as the recorded broadcast program data designated by the user, or the like, for example, under control of the TV application program 202. Also, the video processor 113 can apply the indexing process to the broadcast program data in parallel with the recording process that stores the broadcast program data received by the TV tuner 117 in the HDD 111.

In the video indexing process (also called the facial image indexing process), the video processor 113 analyzes the video image data contained in the video data in unit of frame. Also, the video processor 113 extracts the facial images of the persons from a plurality of frames constituting the video image data respectively, and outputs time stamp information TS indicating a point of time when each extracted facial image appears on the scene in the video data. As the time stamp information TS corresponding to each facial image, an elapsed time from a start of the video data to appearance of the concerned facial image, the frame number from which the concerned facial image is extracted, or the like can be used. At the time, the video processor 113 outputs a size (resolution) of each extracted facial image.

Also, the video processor 113 classifies a plurality of extracted facial images, i.e., sorts extracted facial images into images that are estimated as the same person respectively, and outputs the sorted result (class ID, or the like) as sort information. The face detected result data (facial image, time stamp information TS, size, sort information) output from the video processor 113 are stored in a database 111A as a facial image indexing information 111B. The database 111A is a memory area prepared in the HDD 111 to store the indexing data.

In this case, in the video indexing process, the video processor 113 executes a thumbnail image acquiring process of the thumbnail image displaying function, in parallel with the facial image extracting process of the facial image list displaying process. The "thumbnail image" is the images (reduced images) that correspond to a plurality of frames extracted from the video data at an equal time interval, for example, respectively. That is, the video processor 113 extracts the frame sequentially from the video data at a predetermined equal time interval, for example, irrespective of whether or not the frame corresponds to the frame containing the facial image, and outputs the images corresponding to respective extracted frames (thumbnail image) and the time stamp information TS indicating a point of time when the thumbnail image appears. The thumbnail image acquired result data (thumbnail image, time stamp information TS) output from the video processor 113 are also stored in the database 111A as the thumbnail indexing information.

In the sound indexing process, the video processor 113 detects plural types of attribute sections (commercial section, music section, and talk section) contained in the video data by analyzing the audio data contained in the video data, and outputs section attribute information indicating a start point of time and an end point of time of respective detected attribute sections. The section attribute information are stored in the database 111A as the attribute detection result information. Also, in the sound indexing process, the video processor 113 executes the cheer level detecting process and the upsurge level detecting process described above. Both the result of the cheer level detecting process and the result of the upsurge level detecting process are also stored in the database 111A as a part of the attribute detection result information.

As shown in FIG. 4, the attribute detection result information (section attribute information) is configured by a commercial section table, a music section table, a talk section table, and a cheer/upsurge table, for example.

The commercial section table stores the commercial section attribute information indicating a start point of time and an end point of time of the detected commercial section. When a plurality of commercial sections exist in the sequence from a start position to an end position of the video data, the commercial section attribute information corresponding to a plurality of commercial sections respectively are stored in the commercial section table. In the commercial section table, start time information and end time information indicating a start point of time and an end point of time of the detected commercial sections every commercial section respectively are stored.

The music section table stores the music section attribute information indicating a start point of time and an end point of time of the detected music section. When a plurality of music sections exist in the sequence from the start position to the end position of the video data, the music section attribute information corresponding to a plurality of music sections respectively are stored in the music section table. In the music section table, start time information and end time information indicating a start point of time and an end point of time of the detected music sections every music section respectively are stored.

The talk section table stores the talk section attribute information indicating a start point of time and an endpoint of time of the detected talk section. When a plurality of talk sections exist in the sequence from a start position to an end position of the video data, the talk section attribute information corresponding to a plurality of talk sections respectively are stored in the talk section table. In the talk section table, start time information and end time information indicating a start point of time and an end point of time of the detected talk sections every talk section respectively are stored.

The cheer/upsurge table stores the cheer level and the upsurge level in partial data (time segments T1, T2, T3, . . . ) of a predetermined time length in the video data respectively.

As shown in FIG. 3, the TV application program 202 contains the thumbnail processing section 301 to execute a facial image browsing function. The thumbnail processing section 301 is implemented as an indexing viewer program, for example, and displays an indexing view screen, which is used to get a bird's eye view about an outline of the video data, by using the indexing information (facial image indexing information 111B, thumbnail indexing information, section attribute information, etc.) stored in the database 111A.

In particular, the thumbnail processing section 301 reads the facial image indexing information (facial image, time stamp information TS, size, sort information) from the database 111A, and displays a list of the facial images of the persons who appear on the scene in the video data on a two-dimensional display area on the indexing view screen (referred to a "face thumbnail display area" hereinafter) by using the facial image indexing information. In this case, the thumbnail processing section 301 splits a total time length of the video data into a plurality of time zones at an equal time interval, for example, and selects predetermined number of facial images that appear on the scene in the concerned time zone (predetermined number of rows) from the extracted facial images every time zone. Also, the thumbnail processing section 301 aligns predetermined selected facial images every time zone respectively, and displays them.

The two-dimensional face thumbnail display area contains a plurality of facial image display areas that are arranged in a grid layout containing a plurality of rows and a plurality of columns. A plurality of time zones, the total of which equals to a total time length of the video data, are assigned to a plurality of columns respectively. For example, a plurality of time zones, which are obtained by dividing a total time length of the video data by the number of plural columns at an equal interval and have the same time length mutually, are assigned to a plurality of columns respectively. The time zones assigned to respective columns are not always set to the same time length.

The thumbnail processing section 301 aligns and displays respective facial images belonging to the time zones assigned to respective columns on the facial image display area over the number of rows belonging to respective columns, in order of the frequency of occurrence of these facial images (in order of detected time lengths of the facial images), for example, based on the time stamp information TS and the sort information corresponding to the facial images respectively. In this case, the facial images corresponding to the number of rows are selected from the facial images belonging to the time zone assigned to respective columns in order of the higher frequency of occurrence (appearing frequency), and the selected facial images are aligned from the top to the bottom in order of the appearing frequency, for example. Of course, the facial images that appear in the time zone assigned to respective columns may be aligned and displayed not in order of the appearing frequency but in order of their appearance. A method of displaying the facial image and the thumbnail in a mixed style will be described with reference to a flowchart in FIG. 12 described later.

The facial image browsing function can indicate to the user in an easy-to-understand manner which person appears on the scene around which time zone in overall video data. However, depending on the type of the video data, there is a possibility that the number of appearance of the persons is small and the facial image cannot be displayed in all facial image display areas constituting the face thumbnail display area. Therefore, the thumbnail processing section 301 extracts the thumbnail from the video data by a method described later, and displays such thumbnail in the facial image display areas to which no facial image is assigned. An example of the face thumbnail display area will be described later with reference to FIG. 6 and the subsequent drawings.

The thumbnail processing section 301 executes the thumbnail image displaying function. The thumbnail processing section 301 reads the thumbnail indexing information (thumbnail image, time stamp information TS) from the database 111A, and aligns and displays respective thumbnail images on the thumbnail display area arranged on either of the lower side and the upper side of the face thumbnail display area (referred to as a "foldable thumbnail display area" hereinafter) in order of the appearing time of these thumbnail images by using the thumbnail indexing information.

The thumbnail processing section 301 reads the section attribute information (commercial section attribute information, music section attribute information, talk section attribute information) from the database 111A, and displays the section bar, which contains bar areas showing positions (sections from a start point of time to an end point of time) of respective attribute sections (commercial section, music section, talk section) in the sequence from the start position to the end position of the video data, on either of the lower side and the upper side of the face thumbnail display area on the indexing view screen according to the section attribute information. The section bar contain three sub section bars, i.e., a commercial section bar showing a position of the commercial section, a music section bar showing a position of the music section, a talk section bar showing a position of the talk section, for example.

When a plurality of commercial sections exist in the sequence, a plurality of bar areas indicating positions of a plurality of commercial sections respectively are displayed in the commercial section bar. Similarly, when a plurality of music sections exist in the sequence, a plurality of bar areas indicating positions of a plurality of music sections respectively are displayed in the music section bar. Also, when a plurality of talk sections exist in the sequence, a plurality of bar areas indicating positions of a plurality of talk sections respectively are displayed in the commercial section bar. In the following, each of plural commercial sections that exist in a scattered state in the sequence is referred to as a partial commercial section, each of plural music sections that exist in a scattered state in the sequence is referred to as a partial music section, and each of plural talk sections that exist in a scattered state in the sequence is referred to as a partial talk section.

The display of the section bar on the indexing view screen indicates to the user that respective facial images in the face thumbnail display area correspond to the facial images of the persons who appear on the scene in which attribute section (commercial section, music section, talk section). Therefore, the user can find the data position from which the play should be started from the overall contents data, while taking the characters and the section attribute into consideration.

In addition, the thumbnail processing section 301 reads the cheer level information and the upsurge level information from the database 111A. Then, the thumbnail processing section 301 displays a bar graph, which shows a change of the cheer level and a change of the upsurge level in the sequence from the start position to the end position of the video data respectively, on the level display area arranged on either of the lower side and the upper side of the face thumbnail display area on the indexing view screen according to the cheer level information and the upsurge level information.

The level display area, when the user views, can indicate around which area of the video data the section where the large cheer is given exists, and around which area of the video data the section where the large upsurge is given exists. Therefore, the user can find the data position from which the play is to be started from the overall video data, while taking account of the characters, the section attribute, the cheer level, and the upsurge level.

Figure 5:
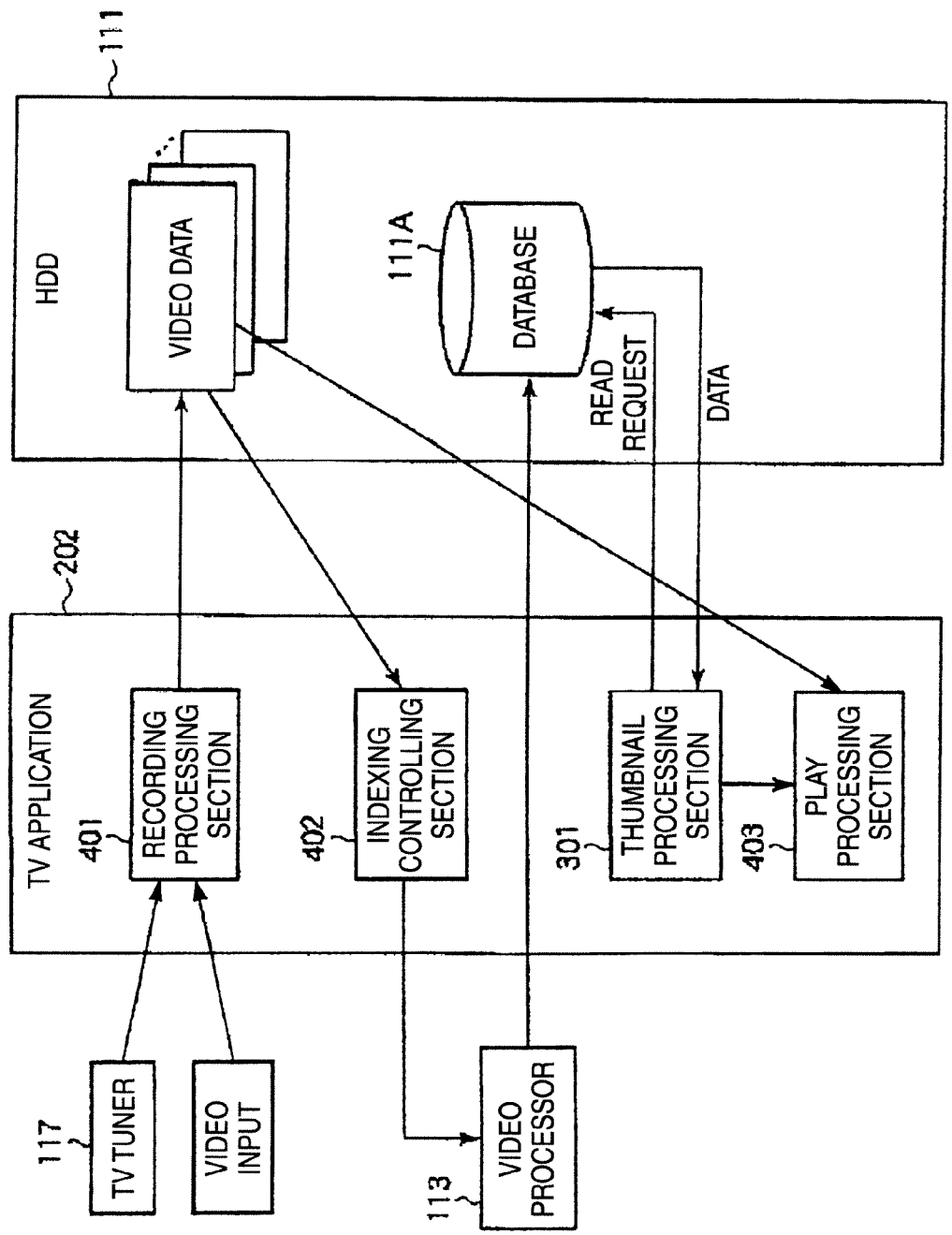
FIG. 5 is a block diagram showing a functional configuration of a program used in the electronic equipment of the embodiment.

Next, a functional configuration of the TV application program 202 will be described with reference to FIG. 5.

The TV application 202 has a recording processing section 401, an indexing controlling section 402, a play processing section 403, and the like, in addition to the thumbnail processing section 301.

The recording processing section 401 executes the recording process that records the broadcast program data being received by the TV tuner 117 or the video data being input from the external equipment in the HDD 111. Also, the recording processing section 401 executes the preset recording process that receives the broadcast program data, which is designated by the recording setting information (channel number, day and time) set previously by the user, via the TV tuner 117, and records the broadcast program data in the HDD 111.

The indexing controlling section 402 controls the video processor (indexing processing section) 113 and causes the video processor 113 to execute the indexing process (video indexing process, sound indexing process). The user can designate whether or not the indexing process should be executed every broadcast program data of the recorded object. For example, with regard to the broadcast program data of the recorded object that is instructed to execute the indexing process, the indexing process is started automatically after the broadcast program data are recorded in the HDD 111. Also, the user can designate the video data whose indexing process should be executed from the video data that have already been stored in the HDD 111.

The play processing section 403 executes the process of playing the video data stored in the HDD 111. Also, the play processing section 403 has a function of starting the play of the video data from a point of time that is a predetermined time ahead of a point of time when the selected facial image or thumbnail appears on the scene, when the play instruction event is input by the user's operation in such a situation that one facial image or thumbnail is selected among the facial image list displayed in the face thumbnail display area of the video data.

When the user designates selectively a plurality of attribute sections, such user can decide the play position of the video data while browsing the facial images that focuses attention on various attributes.

The indexing process may not always executed by the video processor 113. For example, a function of executing the indexing process may be provided to the TV application program 202. In this case, the indexing process is executed by the CPU 101 under control of the TV application program 202.

Next, an example of an indexing view screen will be described with reference to FIG. 6.

Figure 6:
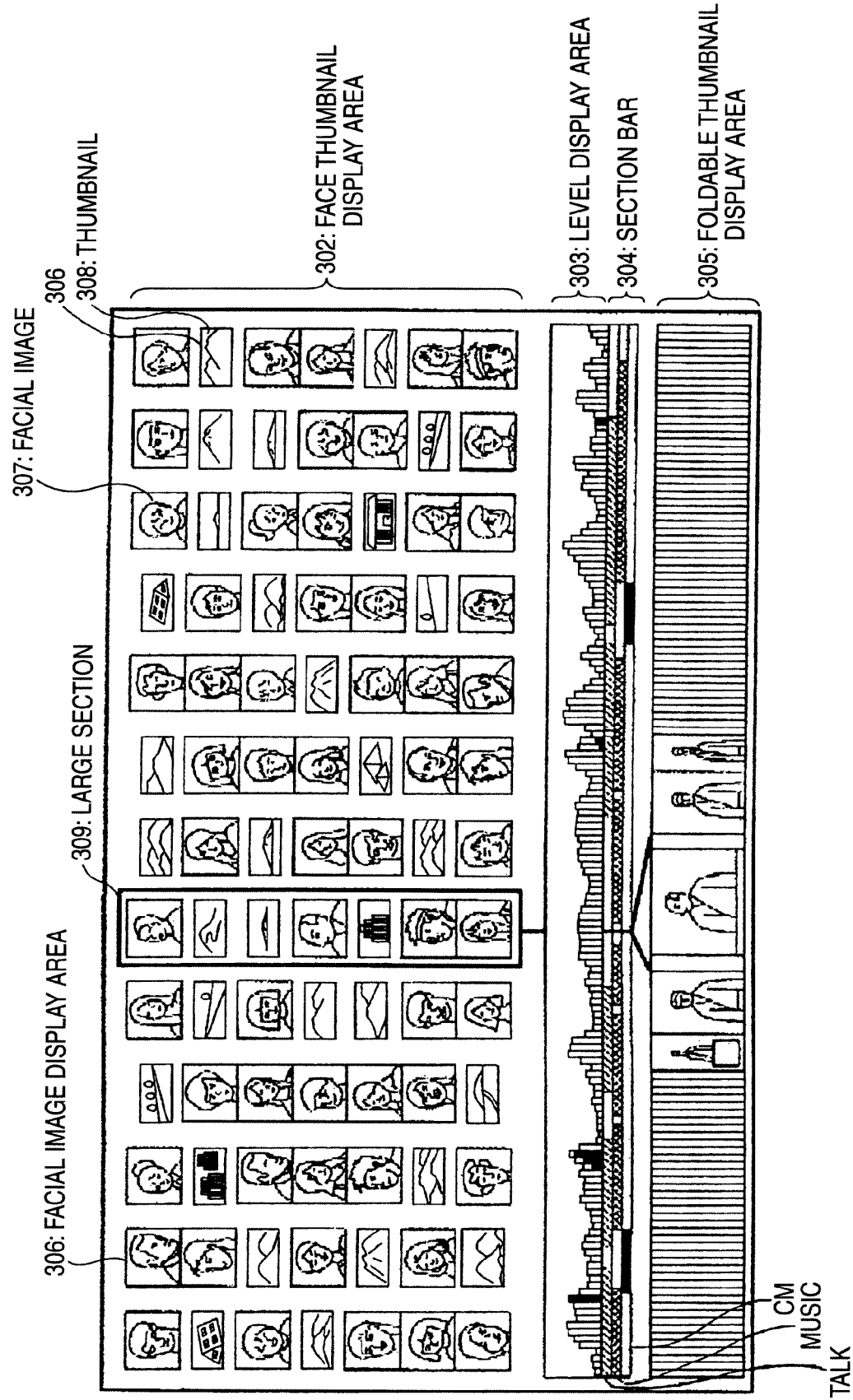
FIG. 6 is a view showing an example of an indexing view screen displayed on a display device by the electronic equipment of the embodiment.

In FIG. 6, an example of the indexing view screen displayed in the LCD 17 by the thumbnail processing section 301 is illustrated. The indexing view screen is the screen that is obtained by applying the indexing process to the video data (e.g., the broadcast program data). The indexing view screen contains the above face thumbnail display area 302 used to display a list of the facial image 307, the above level display area 303, the above section bar 304, and a foldable thumbnail display area 305 used to display a list of the thumbnail image in foldable style.

Here, the "foldable style" is a display style that displays the selected thumbnail image in a normal size (full size), and displays other thumbnail images in smaller size whose lateral size is reduced smaller than normal size. In the example shown in FIG. 6, in order to render the thumbnail images more visible, a lateral reduction ratio of the thumbnail images being located near the selected thumbnail image is set small.

In the level display area 303, a bar graph showing a change of the upsurge level (graph shown in deep color in FIG. 6) and a bar graph showing a change of the cheer level (graph shown in light color in FIG. 6) are displayed.

The section bar 304 contains the talk section bar, the music section bar, and the commercial section bar. In the commercial section bar, a bar area (black stripe area in FIG. 6) is displayed in a position of each commercial section (each partial commercial section). In the music section bar, a bar area (crosshatched stripe area in FIG. 6) is displayed in a position of each music section (each partial music section). In the talk section bar, a bar area (hatched stripe area in FIG. 6) is displayed in a position of each talk section (each partial talk section). The user can select any one of the talk section bar, the music section bar, and the commercial section bar by operating a button, up/down/right/left cursor keys, or the like of the remote controller. Also, the user can select one bar area in the selected section bar 304 by operating the button, the up/down/right/left cursor keys, or the like of the remote controller.

Figure 7:
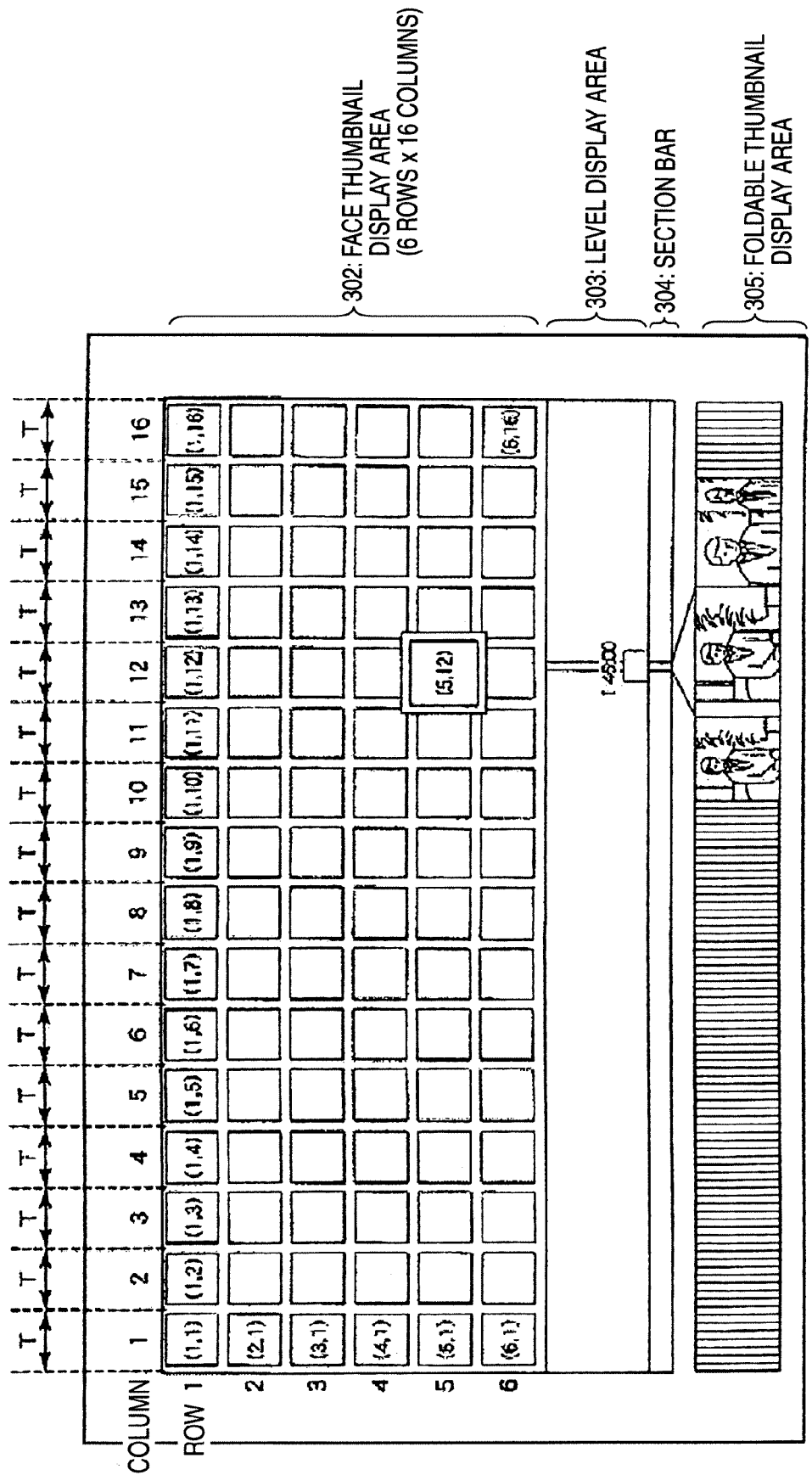
FIG. 7 is a view showing a configurative example of a face thumbnail display area contained in the indexing view screen in FIG. 6.

A configurative example of the face thumbnail display area is shown in FIG. 7.

The face thumbnail display area 302 contains a plurality of facial image display areas 306 that are arranged in a grid layout of plural rows and plural columns. In FIG. 7, the face thumbnail display area 302 is including 6 rows and 16 columns, where 6 rows denote a predetermined number of rows. The number of facial image display areas 306 contained in the face thumbnail display area 302 is 96.

A plurality of time zones that are obtained by dividing a total time length of the video data by the number of columns (=16) at an equal time interval and has the same time length T mutually, for example, are assigned to the column 1 to the column 16 respectively.

For example, when a total time length of the video data is 2 hours, the 2 hours are divided into 16 time zones at an equal time interval. In this case, a time length T of each time zone is 7.5 minute. For example, time zones from the top 0:00:00 to 0:07:30 are allocated to the column 1, time zones from 0:07:30 to 0:15:00 are allocated to the column 2, and time zones from 0:15:00 to 0:22:30 are allocated to the column 3. The time length T of each time zone is changed in response to a total time length of the video data.

The lengths of time zones assigned to a plurality of columns respectively are not necessarily set to the equal value.

The thumbnail processing section 301 aligns and displays the facial images belonging to the time zones being assigned to each column on six facial image display area in each column in order of above frequency, for example, based on the time stamp information that correspond to the facial images extracted by the video processor 113 respectively. In this case, the thumbnail processing section 301 selects the facial images corresponding to the number (six) of rows from the facial images belonging to the time zones assigned to the columns as the display processed object, and displays the facial images corresponding to the number of selected rows in a line respectively. Here, the case where the number of the facial images 307 belonging to the time zones assigned to the columns as the display processed object is less than the number of rows will be described later.

In the manner, in the face thumbnail display area 302, a time axis having a base point in a leftmost position (1,1) and an end of the video data in a rightmost position (6,16) is used.

The user can select a size of the facial image 307, which is displayed in each facial image display area 306 in the face thumbnail display area 302, from "large", "middle", and "small". The number of rows and columns is changed in response to the size of facial image 307 that the user selects. Alternately, the user may select a lowest number-of-sheets mode in which the number of the facial images 307 displayed on the face thumbnail display area 302 is selected or a face preference mode in which all extracted facial images 307 are displayed. A relationship between the size of the facial image 307 and the number of rows and columns is given as follows.

(1) In this case of "large": 3 rows×8 columns
(2) In this case of "middle": 6 rows×16 columns
(3) In this case of "small": 10 rows×24 columns In this case of "large", the facial image 307 is displayed in a 180×180 pixel size, for example. In this case of "middle", the facial image 307 is displayed in a 90×90 pixel size, for example. In this case of "small", the facial image 307 is displayed in a 60×60 pixel size, for example. The default facial image size is set to "middle". The above setting can also be applied to the thumbnail 308. In the above embodiment, it is supposed that the thumbnail 308 is displayed in the facial image display area 306 in a reduced form whose aspect ratio is still kept constant.

The facial image 307 and the thumbnail 308 in the face thumbnail display area 302 are set in either of two states, i.e., a "standard" state in which no size is particularly selected and a "focus" state in which a certain size is selected. A size of the facial image 307 and the thumbnail 308 in a "focus" state is set larger than a size in a "standard" state (180×180, 90×90, or 60×60. These sizes are not for the thumbnail 308). In FIG. 7, the case where the facial image 307 in the coordinates (5, 12) is set in a "focus" state is illustrated.

The number of thumbnail images displayed in the foldable thumbnail display area 305 is set to any one of 240, 144, 96, and 48, for example, according to the user's setting. The default number is set to 240, for example.

The thumbnail image is set to either of two states, i.e., a "standard" state in which no size is particularly selected and a "focus" state in which a certain size is selected. The thumbnail image in a "focus" state is displayed in a size that is larger than other thumbnail images.

Figure 8:
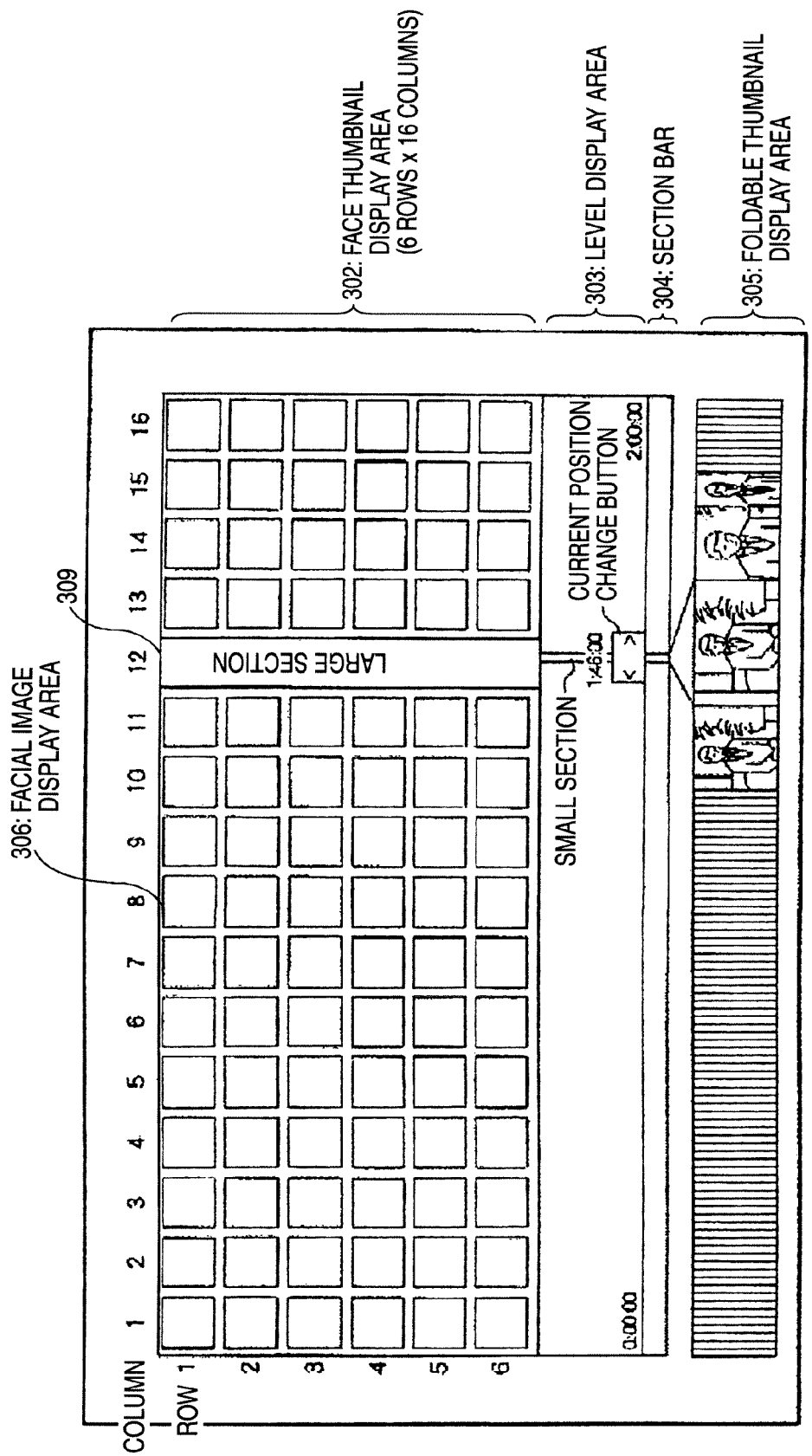
FIG. 8 is a view explaining a relationship between the face thumbnail display area and a foldable thumbnail display area, contained in the indexing view screen in FIG. 6.

Next, a relationship between the face thumbnail display area 302 and the foldable thumbnail display area 305 will be described with reference to FIG. 8 hereunder.

A set of groups of the facial image display area 306 belonging to the same row, i.e., individual column in the face thumbnail display area 302 is called a "large section 310". Also, a section obtained by splitting further the large section 310 is called a "small section". The number of small sections contained in one large section 310 is given as a quotient that is obtained by dividing the number of thumbnail images displayed in the foldable thumbnail display area 305 by the number of columns of the face thumbnail display area 302. For example, when the face thumbnail display area 302 is 6 rows×16 columns and the number of thumbnail images displayed in the foldable thumbnail display area 305 is 240, the number of small sections contained in one large section 310 is given as 15 (=240×16). One large section 310 contains 15 small sections. In other words, 15 thumbnail images belong to the time zone corresponding to one large section 310.

The thumbnail processing section 301 displays a longitudinal bar to connect the large section 310 and the thumbnail image. The longitudinal bar is used to indicate to which small section of 15 small sections contained in the large section 310 the small section corresponding to a certain thumbnail image corresponds. The longitudinal bar is displayed in a position of the small section, which corresponds to the thumbnail image, out of 15 small sections contained in the large section 310. For example, when a certain thumbnail image is the top image out of 15 thumbnail images belonging to the time zone corresponding to a certain large section 310, i.e., the image corresponding to the top small section in the large section 310, the thumbnail image is connected to the left end of the large section 310 by the longitudinal bar. When a certain thumbnail image is the end image out of 15 thumbnail images belonging to the time zone corresponding to a certain large section 310, i.e., the image corresponding to the end small section in the large section 310, the thumbnail image is connected to the right end of the large section 310 by the longitudinal bar.

The thumbnail processing section 301 displays time information indicating a point of time when the thumbnail image appears on the scene on the indexing view screen, based on the time stamp information TS of the thumbnail image.

A "current position change" button is an operation button used to change the thumbnail image as the selected object. When the user operates a left cursor key or a right cursor key in a situation that the "current position change" button is focused, the thumbnail image as the selected object moves leftward or rightward in unit of one small section, for example.

When the facial image 307 or the thumbnail 308 located in the face thumbnail display area 302 is selected by the user on the indexing view screen containing the face thumbnail display area 302 and the foldable thumbnail display area 305 both have such relationship, the thumbnail processing section 301 specifies the small section containing a time indicated by the time stamp information TS of the facial image 307 or the thumbnail 308, and controls the display of the thumbnail image in the foldable thumbnail display area 305 to display the thumbnail image corresponding to the small section in normal size.

Figure 9:
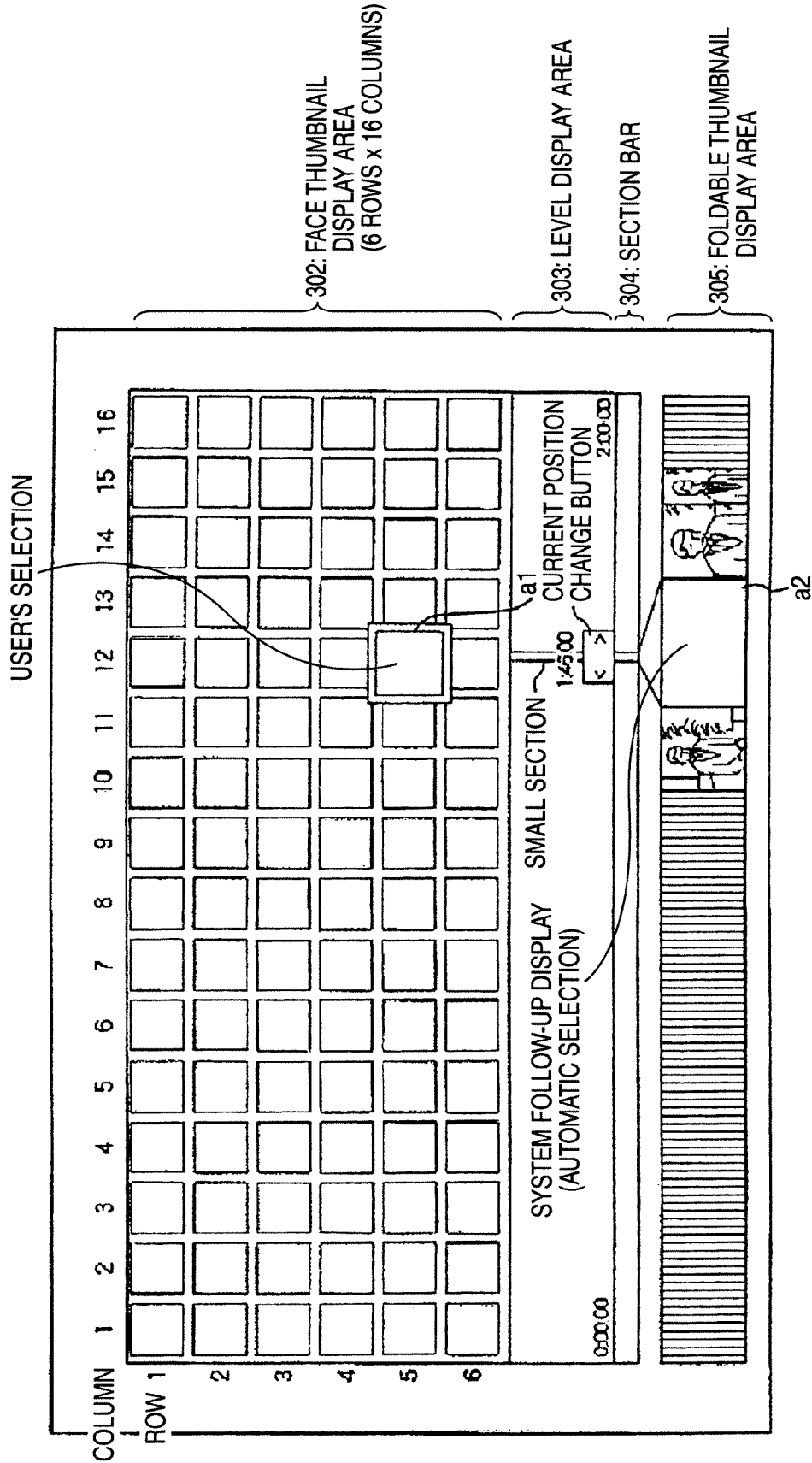
FIG. 9 is a view explaining linkage display control between the face thumbnail display area and the foldable thumbnail display area contained in the indexing view screen in FIG. 6.

That is, as shown in FIG. 9, when a certain facial image (a1) is selected by the user, a thumbnail image (a2) in the time zone where the person having the facial image (a1) appears on the scene is automatically selected simultaneously with the facial image (a1) and displayed to follow the thumbnail image (a1).

On the contrary, when a certain thumbnail image on the foldable thumbnail display area 305 is selected by the user on the indexing view screen, the thumbnail processing section 301 detects the facial images 307 or the thumbnails 308 having a time in the small section corresponding to the thumbnail image as the time stamp information TS, and highlight-displays the facial images 307 or the thumbnails 308 such that they can be discriminated from other facial images 307 or thumbnails 308.

Figure 10:
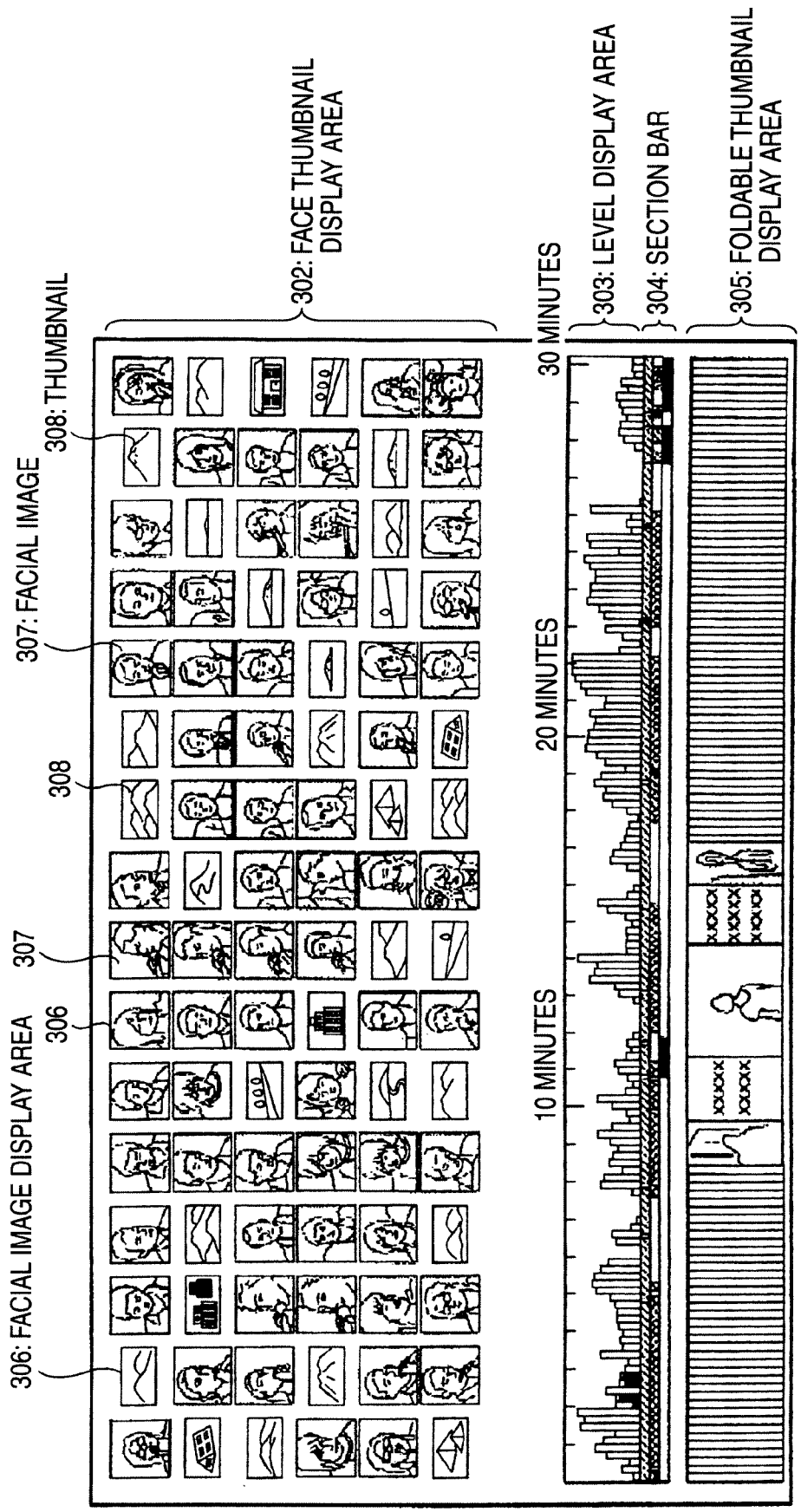
FIG. 10 is a first view showing a concrete example of the linkage display between the face thumbnail display area and the foldable thumbnail display area contained in the indexing view screen in FIG. 6.
Figure 11:
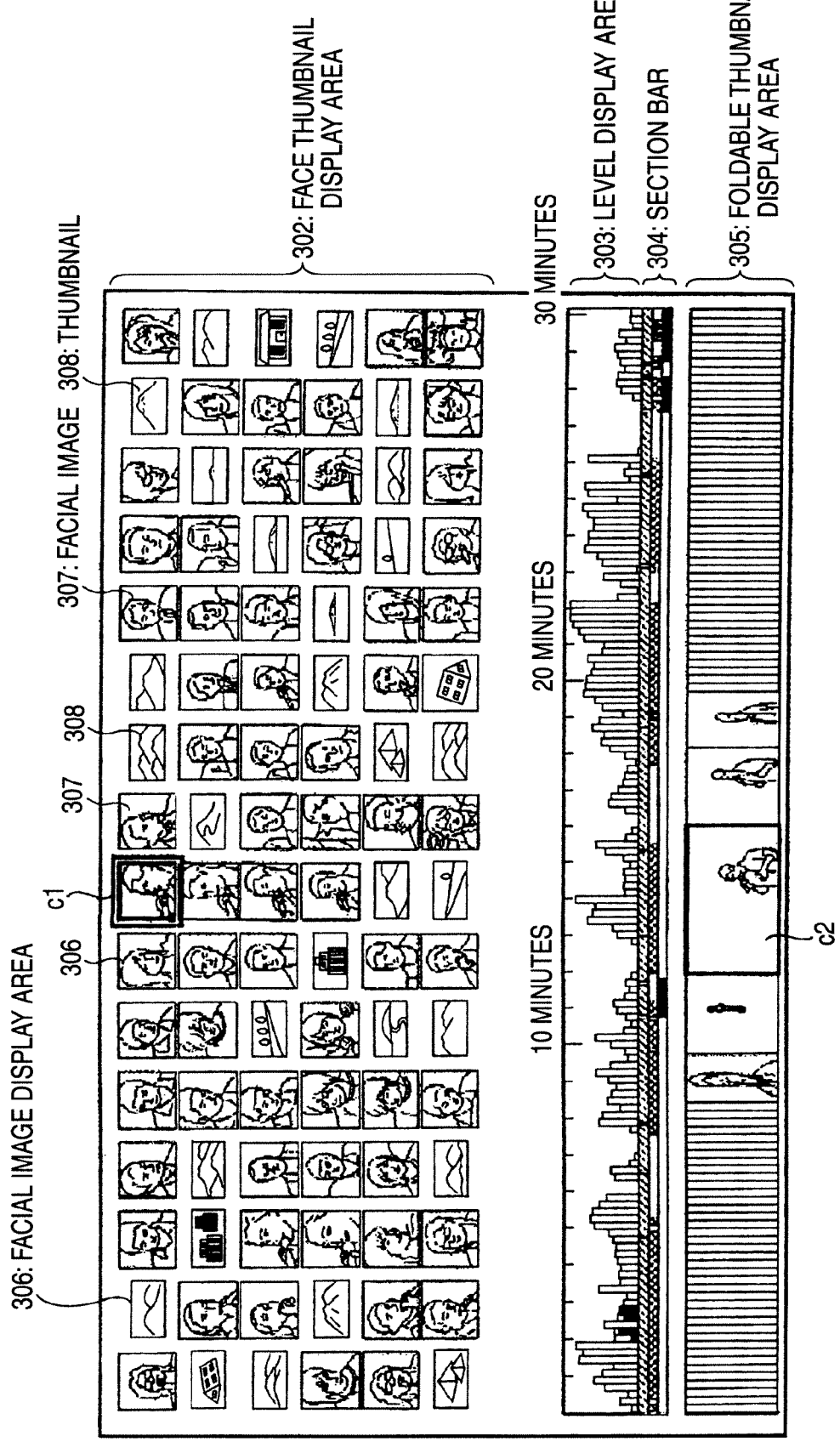
FIG. 11 is a second view showing another concrete example of the linkage display between the face thumbnail display area and the foldable thumbnail display area contained in the indexing view screen in FIG. 6.

In order to describe the details of a transition example of the screen, it is now assumed that the indexing view screen is set in a condition shown in FIG. 10. In the condition, as shown in FIG. 11, when the user selects a certain facial image (c1) on the face thumbnail display area 302, the display of the thumbnail image in the foldable thumbnail display area 305 is transferred simultaneously with the facial image (c1) such that a thumbnail image (c2) in the time zone where the person having the facial image (c1) appears on the scene is displayed in normal size.

After the confirmation, when the user instructs to start the playback of the video data in a situation that the facial image 307 or the thumbnail 308 in the face thumbnail display area 302 is selected, such user can start the playback of the video data from a point in time that is a predetermine time ahead of the time indicated by the time stamp information TS of the facial image 307 or the thumbnail 308. Alternately, when the user instructs to start the playback of the video data in a situation that the thumbnail image on the foldable thumbnail display area 305 is selected, such user can user can start the playback of the video data from a top position (point in time) of the small section corresponding to the thumbnail image.

As described above, in the personal computer 10 in which the display of the face thumbnail display area 302 and the foldable thumbnail display area 305 is controlled cooperatively, the video of the scene where a desired person appears on the scene can be indicated in response to a simple operation and also the facial image 307 of the person who appears on respective scenes can be indicated in response to a simple operation. Also, even in the video data in which the number of persons who appear on the scene is small, the user can select easily a desired scene by indicating the thumbnail 308.

Figure 12:
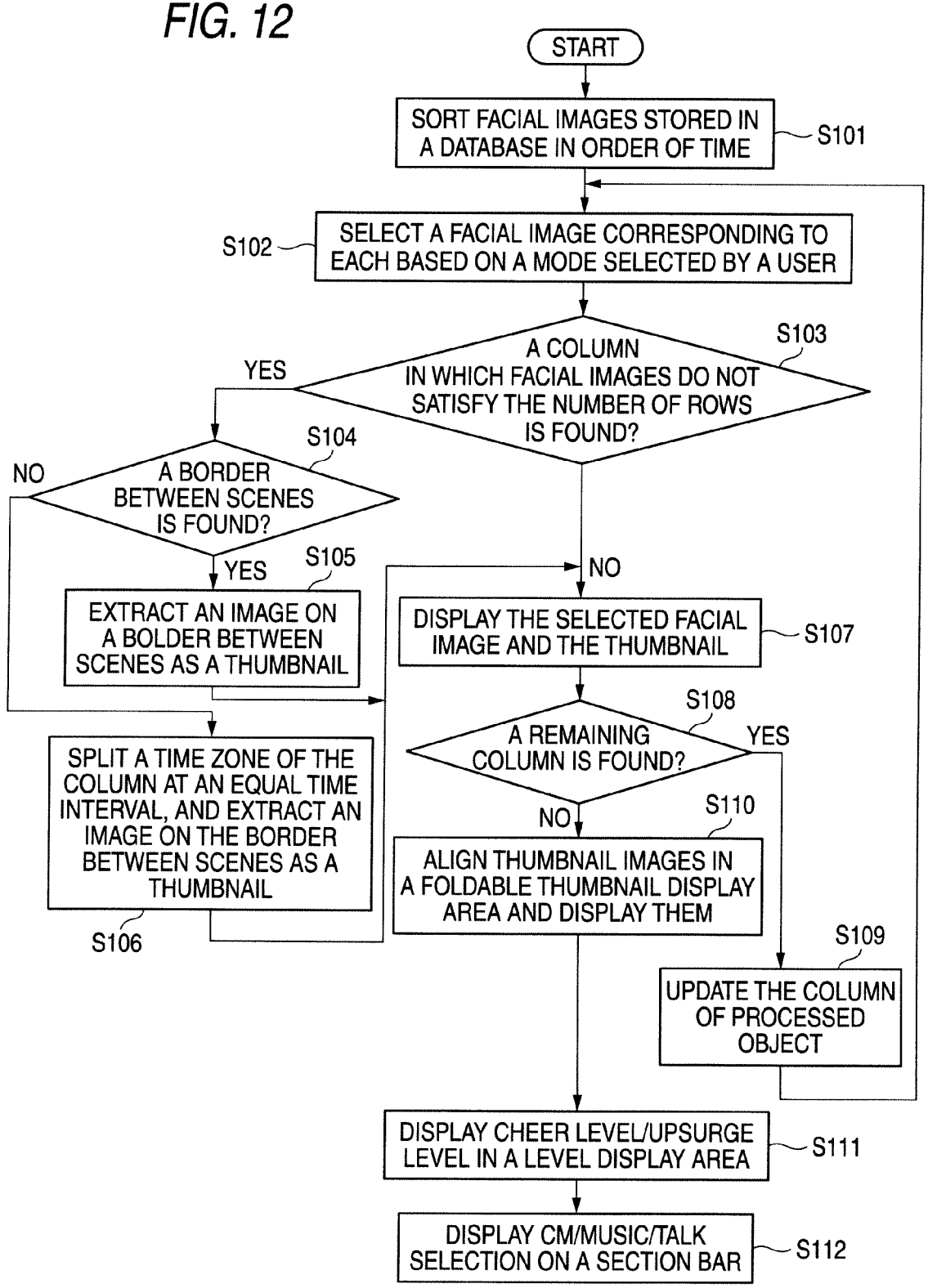
FIG. 12 is a flowchart showing an example of procedures of a facial image list display process executed by the electronic equipment of the embodiment.

Next, procedures of the display process executed by the thumbnail processing section 301 will be described with reference to a flowchart shown in FIG. 12.

First, the thumbnail processing section 301 sorts the facial images 307 stored in the database 111A in order of appearing times of the facial images 307 based on the time stamp information TS corresponding to these facial images 307 respectively (step S101). Then, the thumbnail processing section 301 decides the number of rows and columns based on the face preference mode and the lowest number of sheets mode designated by the user, and also calculates the time zone assigned to respective columns by splitting a total time length of the video data as the indexed object equally by the number of columns, for example. Then, the thumbnail processing section 301 selects the facial images 307 corresponding to the number of rows from the facial images 307 belonging to the time zone assigned to the column as the display processed object (step S102). When the number of the facial images 307 belonging to the time zone assigned to the column as the display processed object is larger tan the number of rows, the thumbnail processing section 301 can execute the process that selects preferentially the facial image whose frequency of occurrence is high, for example.

Figure 13:
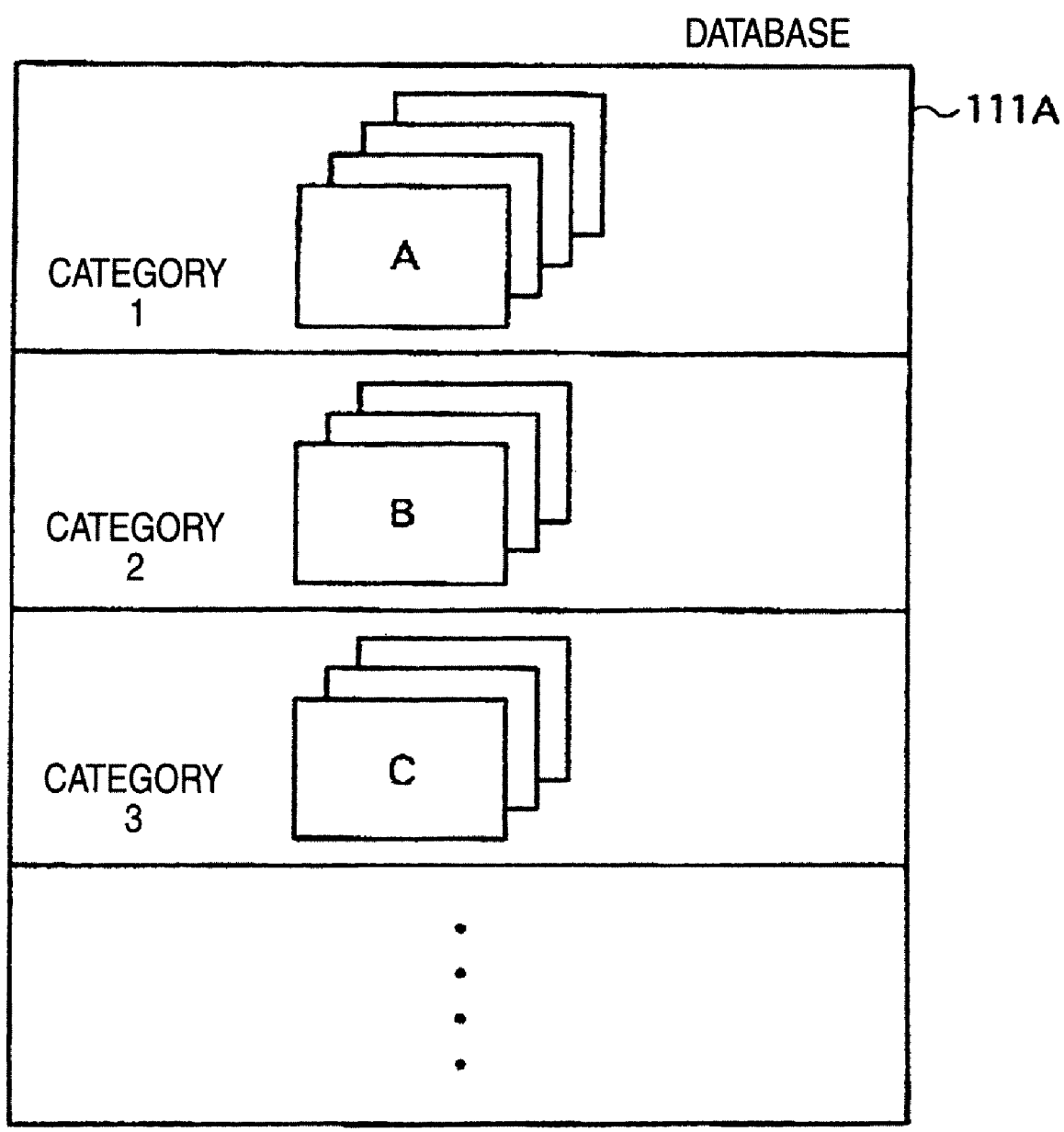
FIG. 13 is a view showing a manner in which the facial images are sorted by category by the electronic equipment of the embodiment respectively.

In this case, the thumbnail processing section 301 selects preferentially the facial images 307 whose appearing frequency in the concerned time zone is high from the facial images 307 belonging to the time zone assigned to the column as the display processed object. For example, the video processor 113 can execute the clustering process that sorts the facial images 307 of the same person into the same category, based on the correlation between respective feature data of the extracted facial images 307. In this case, as shown in FIG. 13, respective facial images 307 are sorted every person (i.e., every category) and stored in the database 111A. In FIG. 13, a category 1 shows a set of facial images 307 of a person A, a category 2 shows a set of facial images 307 of a person B, and a category 3 shows a set of facial images 307 of a person C.

The thumbnail processing section 301 selects preferentially the facial images 307 of the person whose appearing frequency on the scene is high. In this case, in the time zone in which only the facial images 307 of the particular same person continue to appear for a relatively long time, a plurality of different facial images 307 of the same person may be displayed on the columns corresponding to the concerned time zone.

When the number of facial images 307 belonging to the time zones assigned to the column as the display processed object is larger than the number of rows, the thumbnail processing section 301 can execute the process that selects preferentially the facial images 307 whose size is large from the facial images 307 belonging to the time zones assigned to the column as the display processed object, based on respective size information of the facial images 307 stored in the database 111A.

A size of the facial image 307 extracted from the frame that shows the close-up face becomes relatively large. Therefore, as a size of the extracted facial image 307 becomes larger, such a possibility is higher that importance of the person is high. Accordingly, the facial image 307 of the person whose importance is high can be displayed preferentially by selecting preferentially the facial image 307 of large size.

When there is the column in which the number of facial images 307 is less than the number of rows (YES in step S103), the thumbnail processing section 301 extracts the thumbnails 308 from the video data by the following method.

First, when the border between adjacent attribute intervals, i.e., the border between adjacent scenes is present in the time zones assigned to the rows (YES in step S104), the thumbnail processing section 301 extracts the image on the border between adjacent scenes as the thumbnail 308 having the time stamp information showing the same or near time as the border point, based on the time information indicating the border between adjacent scenes (in the example in FIG. 4, corresponds to the start time, the end time, or the like), and then assigns the image to the concerned column (step S105). At the time, when the number of borders between adjacent scenes is larger than the number of facial images 307 that do not satisfy the number of rows, the thumbnail 308 may be selected by selecting preferentially the image at a start point of time of the longest scene in the time length based on the time information or selecting the border between plural scenes at random, or the image at a start point of time may be selected as the thumbnail 308 by selecting preferentially the scene that does not contain the facial images 307 displayed on the concerned column, for example. Also, the image at a start point of time may be selected as the thumbnail 308 by selecting preferentially the border between the scenes that is remote from the facial image 307 displayed on the concerned column. The selecting way is not limited to them. Since the thumbnail 308 in which the contents of the video data are reflected much more can be extracted by the selection, the user can start the playback from a desired scene. It is supposed that, when the number of borders between adjacent scenes is smaller than the number of facial images 307 that do not satisfy the number of rows, the insufficient thumbnails 308 are supplemented by the subsequent method.

When there is no border among the columns (NO in step S104) or the number of thumbnails 308 is insufficient in step S105, the thumbnail processing section 301 split the time zone assigned to the column at an equal time interval based on the number of facial images 307 that do not satisfy the number of rows or the number of insufficient thumbnails 308, and extract the images of the video data at the split point of time as the thumbnail 308 and assigns them to the concerned column (step S106).

Then, the thumbnail processing section 301 aligns and displays the selected facial images 307 and the thumbnails 308 on the column in a plurality of facial image display areas 306 in the column of the display processed object (step S107). As the mixed display of the facial images 307 and the thumbnails 308, for example, first the facial images 307 may be aligned in order of frequency and then the thumbnails 308 may be aligned along a time series, or both the facial images 307 and the thumbnails 308 may be aligned along a time series. But the mixed display is not limited to the.

The processes in steps S102 to S106 are executed repeatedly while updating the number of the column of the display processed object until the process in all columns has been completed (YES in step S108, step S109). As a result, a plurality of facial images 307 and thumbnails 308 are displayed in the facial image display area 306 in the first display mode.

When the process in all columns has been completed (NO in step S108), the thumbnail processing section 301 aligns and displays respective thumbnail images stored in the database 111A on the foldable thumbnail display area 305 in order of appearing times of these thumbnail images, based on the time stamp information TS of respective thumbnail images (step S110).

Then, the thumbnail processing section 301 reads the cheer level information and the upsurge level information from the database 111A, and then displays both a graph, which shows a change of the cheer level in the sequence from a start position to an end position of the video data, and a graph, which shows a change of the upsurge level in the sequence, in the level display area 303 in accordance with the cheer level information and the upsurge level information respectively (step S111).

Figure 14:
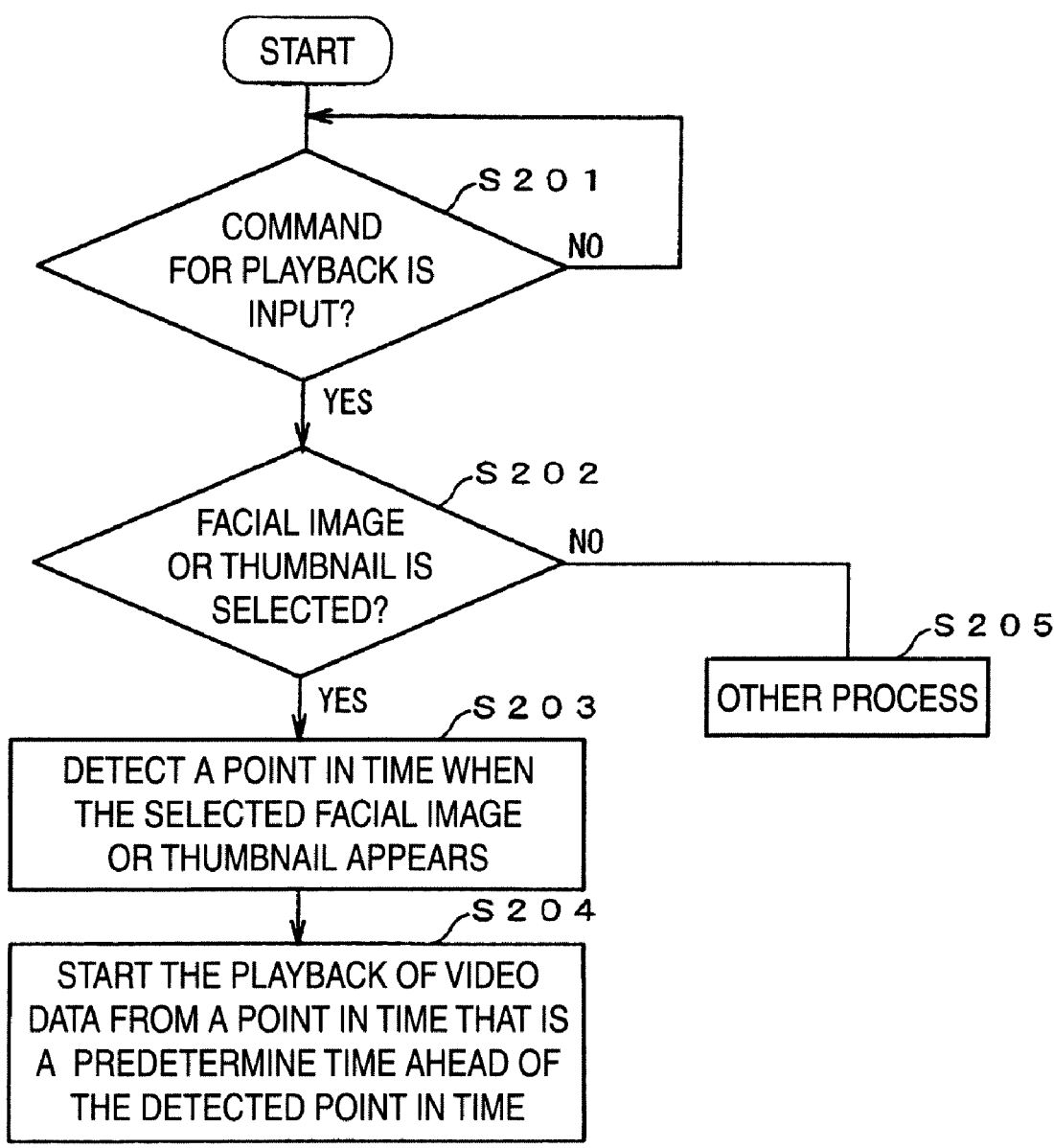
FIG. 14 is a flowchart showing an example of procedures of a playing process executed by the electronic equipment of the embodiment.

Next, procedures of the playing process executed by the play processing section 403 will be described with reference to a flowchart shown in FIG. 14.

When the command for playback of the vide contents data is input by the user (YES in step S201), the play processing section 403 as well as the thumbnail processing section 301 decides whether or not the facial image 307 or the thumbnail 308 in the face thumbnail display area 302 is selected by the user (step S202). If the selected facial image 307 or the selected thumbnail 308 is present (YES in step S202), the play processing section 403 detects a point in time when the selected facial image 307 or the selected thumbnail 308 appears on the scene based on the time stamp information TS of the selected facial image 307 or the selected thumbnail 308 (step S203). Then, the play processing section 403 starts the playback of the video data from a point in time that is a predetermine time, e.g., 2 second, ahead of the detected point in time (step S204).

When the selected facial image 307 or the selected thumbnail 308 is not present (NO in step S202), the play processing section 403 as well as the thumbnail processing section 301 decides whether or not the thumbnail image on the foldable thumbnail display area 305 is selected by the user, as other process. Then, if the selected thumbnail image is present, the play processing section 403 detects the top position (point of time) of the small section corresponding to the thumbnail image, and starts the playback of the video data from the detected point of time (step S205).

As described above, in the present embodiment, it can be indicated to the user which person appears on the scene around which time zone in overall video data, without playback of the video data. Also, the video of the scene where the desired person appears on the scene can be indicated in response to a simple operation, and also the facial image 307 of the person who appears on respective scenes can be indicated in response to a simple operation. Also, even in the video data in which a small number of persons appear on the scene, the thumbnails 308 can be extracted in the same numbers as the facial images 307 that do not satisfy the number of rows and can be indicated together with the facial images 307. Therefore, the facial images 307 and the thumbnail 308 in which the contents of the video data are reflected much more can be offered, and a width of user's selections can be widened and user's convenience can be enhanced.

In the present embodiment, the indexing information (face indexing information 111B, section attribute information, etc.) are produced by the video processor 113 acting as the indexing processing section. When the indexing information corresponding to the broadcast program data is contained previously in the broadcast program data, for example, there is no need to execute the indexing process. Therefore, the facial image browsing function of the present embodiment can be implemented only by the database 111A and the thumbnail processing section 301.

Also, all procedures of the facial image list displaying process of the present embodiment can be implemented by the software as the image display control program. Therefore, the similar advantages to the present embodiment can be easily implemented by introducing the software into the normal computer through the computer-readable memory medium.

The electronic equipment of the present embodiment can be implemented by not only the personal computer 10 but also various consumer electronic equipments such as HDD recorder, DVD recorder, television receiver, and the like, for example. In this case, the function of the TV application program 202 can be implemented by the hardware such as DSP, microcomputer, or the like.

The present invention is not limited to the embodiment described above, and the present invention may be embodied by varying the constituent elements within a scope not departing from a gist thereof in the implementing stage. Also, various inventions can be created by using an appropriate combination of a plurality of constituent elements disclosed in the embodiment. For example, some elements and components may be omitted from the configuration described in the embodiment. In addition, the constituent elements may be combined appropriately throughout different embodiments.

What is claimed is:

1. An electronic equipment comprising:
   a storage unit configured to store a plurality of images extracted from video contents data and time stamp information indicating time points at which the plurality of images appear on a scene in the video contents data; and
   a processing unit configured to form a plurality of image display areas in a two-dimensional display area that is arranged in a grid layout, the grid layout including a given number of rows and a plurality of columns to which a plurality of time zones constituting a total length of the video contents data are assigned respectively, based on the time stamp information, to align and display face images belonging to the time zones assigned to the plurality of columns in the plurality of image display areas, and to display a thumbnail extracted from the video contents data corresponding to the time zone assigned to respective columns, together with the face images aligned on the respective columns, in the two-dimensional display area.

2. The electronic equipment according to claim 1, wherein the processing unit is configured to split the video contents data into scenes and display a thumbnail extracted from a border and neighborhood between the scenes together with the face images on the columns corresponding to time zone containing the border between the scenes.

3. The electronic equipment according to claim 1, wherein the processing unit is configured to split the time zone corresponding to the columns, on which the thumbnail and the face images are displayed, at an equal time interval based on a number of the face images, and displays the thumbnail extracted from split points and neighborhoods on the respective columns.

4. The electronic equipment according to claim 1 further comprising a playback controlling unit, wherein, when an instruction for choosing either of the face image and the thumbnail is made and an instruction for playing the video contents data is made, the playback controlling unit starts a playback of the video contents data from a time point that is a given time ahead of a time point when the chosen face image or the chosen thumbnail appears on the scene or a time point when the chosen face image or the chosen thumbnail appears on the scene, based on the time stamp information.

5. An image display controlling method for an electronic equipment having a storage unit configured to store a plurality of face images extracted from video contents data and time stamp information indicating time points at which the plurality of face images appear on a scene in the video contents data, the method comprising:

forming a plurality of image display areas that are contained in a two-dimensional display area and are arranged in a grid layout, which contains a given number of rows and a plurality of columns to which a plurality of time zones constituting a total time length of the video contents data are assigned respectively, based on the time stamp information, aligning and displaying the face images belonging to the time zones assigned to the plurality of columns in the plurality of image display areas; and displaying a thumbnail extracted from the video contents data corresponding to the time zone assigned to respective columns, together with the face images aligned on the respective columns.

6. The image display controlling method according to claim 5, wherein the forming of the plurality of image display areas comprises splitting the video contents data into scenes, and displaying a thumbnail extracted from a border and neighborhood between the scenes together with the face images on the columns corresponding to the time zone containing the border between the scenes.

7. The image display controlling method according to claim 5, wherein the forming of the plurality of image display areas comprises splitting the time zone corresponding to the columns, on which the thumbnail and the face images are displayed, at an equal time interval based on a number of the face images, and displaying the thumbnail extracted from split points and neighborhoods on the respective columns.

* * * * *